(12) United States Patent
Yoshida

(10) Patent No.: US 6,183,653 B1
(45) Date of Patent: Feb. 6, 2001

(54) APPARATUS AND METHOD FOR REMOVING SLUDGE FROM FILTER FOR USE IN ELECTRIC DISCHARGE MACHINE

(76) Inventor: Takeshi Yoshida, 278, Miyadera, Iruma-shi Saitama 358-0014 (JP)

(*) Notice: Under 35 U.S.C. 154(b), the term of this patent shall be extended for 0 days.

(21) Appl. No.: 09/304,926

(22) Filed: May 4, 1999

(30) Foreign Application Priority Data

May 7, 1998 (JP) .................................................. 10-124384

(51) Int. Cl.[7] ............................. B01D 33/06; B01D 37/00
(52) U.S. Cl. ......................... 210/770; 210/784; 210/791; 210/394; 210/402; 210/407
(58) Field of Search ................................. 210/770, 780, 210/784, 791, 391, 394, 402, 407; 219/69.14

(56) References Cited

U.S. PATENT DOCUMENTS

| | | | |
|---|---|---|---|
| 4,844,799 | * 7/1989 | Lee ......................................... | 210/394 |
| 4,921,602 | * 5/1990 | Froderberg et al. .................. | 210/394 |
| 5,071,567 | * 12/1991 | Corcelle et al. ....................... | 210/744 |
| 5,217,605 | * 6/1993 | Kottke ................................... | 210/445 |
| 5,298,161 | * 3/1994 | Sieg ....................................... | 210/388 |
| 5,434,381 | * 7/1995 | Mitcheson ........................... | 219/69.14 |

\* cited by examiner

*Primary Examiner*—Robert J. Popovics
(74) *Attorney, Agent, or Firm*—Webb Zeisenheim Logsdon Orkin & Hanson, P.C.

(57) ABSTRACT

An apparatus for removing sludge is applied to a generally cylindrical filter for use in an electric discharge machine. The filter removes sludge in a process solution used in the electric discharge machine by flowing the process solution from an inner periphery surface to an outer periphery surface and/or the outer periphery surface to the inner periphery surface of the filter. A filter support device holds the filter rotatively with the central axis thereof as the central figure and inclining the central axis by a predetermined angle to the horizontal direction. The filter support device also includes cams for providing rotational driving force and successive impactive force to the filter. A motor provides rotational driving force to the cams. Sludge storage may receive the sludge falling from the filter. The filter support device may further alternate the inclined direction of the filter in a predetermined cycle by rotating with an axis perpendicular to the central axis as the central figure.

7 Claims, 4 Drawing Sheets

APPARATUS AND METHOD FOR REMOVING SLUDGE FROM FILTER FOR USE IN ELECTRIC DISCHARGE MACHINE

BACKGROUND OF THE INVENTION

1. Field of the Invention

The present invention generally relates to an electric discharge machine, such as a wire-cutting machine for processing metals with electric discharges, and, more particularly, to an apparatus and a method for removing sludge attached to a filter element arranged in the circulation path of a process solution for use in the electric discharge machine.

2. Description of the Related Art

The wire-cutting electric discharge machine processes, for example, cuts off a work that is immersed into the process solution within a process bath by melting the work partially with discharges intermittently between the work and a wire electrode. The process solution is required to satisfy conditions, such as a predetermined dielectric strength and a low viscosity, so as to remove sludge easily, and accordingly includes water as a main material in the art. The used process solution contains sludge. This sludge is removed through the filter element arranged in the circulation path of the process solution. A part of the solution further passes through an ion exchange resin in order to increase an insulation resistance and is reused. The sludge becomes an adhesive hydroxide compound after the ion exchange and contains powders with various particle diameters between several $\mu$mm and 1 mm.

A filter element that has a white clay layer formed on a surface of pleated (petal shaped) paper in order to increase a filtering area is employed as the filter for removing sludge container in the process solution in the art (for example, JPA 59-64234).

Such filters for use in the electric discharge machine, however, have a disadvantage of a high manufacture cost and a high maintenance expense. In particular, the amount of sludge contained in the process solution increases with the increased performance due to the recent progress in wire-cutting machines and the miniaturization of a cross-sectional area of the wire. The particle diameter also has a tendency to be further miniaturized down to 5 $\mu$mm or less. Thus, if using the conventional filter, the filter element is clogged after running it continuously for about 20 hours and then is required to substitute a new one. Therefore, there is a disadvantage that the expensive filter extremely increases the processing cost.

SUMMARY OF THE INVENTION

The present invention is made in consideration of such disadvantages and has an object to provide an apparatus for removing sludge from a filter element for use in the electric discharge machine and for effectively removing sludge attached to the used and dried filter element (hereinafter referred to as the filter) so as to reuse the filter, thus cutting the maintenance expense sharply.

Another object of the present invention is to provide an apparatus, for removing sludge from a filter for use in the discharge machine, capable of further improving sludge removal efficiency.

A further object of the present invention is to provide a method, for removing sludge from a filter for use in the electric discharge machine, capable of effectively removing sludge so as to reuse the filter and reduce the maintenance expense.

A first aspect of the present invention is provided with an apparatus for removing sludge, applied to a generally cylindrical filter for use in an electric discharge machine. The filter is adapted to remove sludge in a process solution used in the electric discharge machine. The process solution flows from an inner periphery surface to an outer periphery surface and/or the outer periphery surface to the inner periphery surface of the filter. The apparatus, capable of removing sludge attached on a surface of the filter, comprises a filter support device for holding the filter rotatively with the central axis thereof as the central figure and inclining the central axis by a predetermined angle to the horizontal direction.

The filter support device includes cams for providing rotational driving force and successive impactive force to the filter. The apparatus also comprises a motor for providing rotational driving force to the cam, and sludge storage for receiving the sludge falling from the filter.

The filter support device may include a front plate arranged at a front edge side of the filter; a back plate arranged at a rear edge side of the filter; a drive shaft disposed rotatively between the front and back plates; a plurality of cams mounted on front and rear edge portions of the drive shaft, in which the cams contact with front and rear edge portions of an outer periphery of the filter with a certain frictional force; a rotation transmission mechanism for transmitting rotational force of the motor to the drive shaft; a pair of auxiliary shafts arranged on both sides of the drive shaft between the front and back plates; a plurality of rollers mounted on front and rear edge portions of the auxiliary shafts for supporting rotatively the front and rear edge portions of the outer periphery of the filter; a bearing arranged on a plane of the back plate opposing to the rear edge portion of the filter for holding a rear edge surface of the filter rotatively and up/down movably; and a plurality of legs for supporting the front and back plates and the drive and auxiliary shafts inclined by a predetermined angle to the horizontal direction.

According to the first aspect of the present invention, the filter support device holds the filter rotatively in a state where the central axis of the filter is inclined by a predetermined angle to the horizontal direction, and the cams apply rotational driving force and vibrations in the up/down direction to the filter. The sludge attached on the surface of the filter travels on the outer or inner periphery of the filter from a higher portion to a lower portion due to rotations and up/down vibrations and finally falls into the sludge storage for accommodation. The sludge attached to the used filter can be effectively removed and the filter can be reused with using the apparatus. The present invention can reduce the maintenance expense for processing effectively and may also contribute greatly to reduce the resource accordingly.

A second aspect of the present invention is provided with an apparatus for removing sludge, applied to an entirely cylindrical filter for use in an electric discharge machine. The filter is adapted to remove sludge in a process solution used in the electric discharge machine. The process solution flows from an inner periphery surface to an outer periphery surface and/or the outer periphery surface to the inner periphery surface of the filter. The apparatus, capable of removing sludge attached on a surface of the filter, comprises a filter support device for holding the filter rotatively with the central axis thereof as the central figure and inclining the central axis by a predetermined angle to the horizontal direction. The filter support device includes cams for providing rotational driving force and successive impactive force to the filter. The apparatus also comprises a motor for providing rotational driving force to the cam, a mechanism for inverting an inclined direction of the filter by rotating the filter support device with an axis perpendicular to the central axis of the filter and the central figure in a predetermined cycle, and a sludge storage for receiving the sludge falling from the filter.

According to the second aspect of the present invention, the apparatus further comprises the mechanism for inverting the inclined direction of the filter by rotating the filter support device with the axis perpendicular to the central axis of the filter as the central figure in a predetermined cycle, in addition to the first aspect. Thus, the sludge removal efficiency can be further improved.

A third aspect of the present invention is provided with a method for removing sludge, applied to an entirely cylindrical filter for use in an electric discharge machine. The filter is adapted to remove sludge in a process solution used in the electric discharge machine. The process solution flows from an inner periphery surface to an outer periphery surface and/or the outer periphery surface to the inner periphery surface of the filter. The method capable of removing sludge attached on a surface of the filter, comprises the steps of: applying a pressured air into the filter to compulsorily exclude the process solution contained within the filter; drying the sludge remained within the filter; and dropping the dried sludge from the filter by applying vibrations to the filter.

According to the third aspect of the present invention, the step of drying the sludge remained within the filter is implemented as a pretreatment preceding the step of applying vibrations to the filter. Thus, the sludge removal efficiency with the sludge removing apparatus according to the present invention can be effectively improved. An addition of the step of applying the pressured air into the filter to exclude the process solution contained within the filter, as a pretreatment preceding the step of drying the sludge, can shorten the drying process and further increase operational efficiency.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Preferred embodiments of the present invention will be described below with reference to the drawings.

Figure 1:
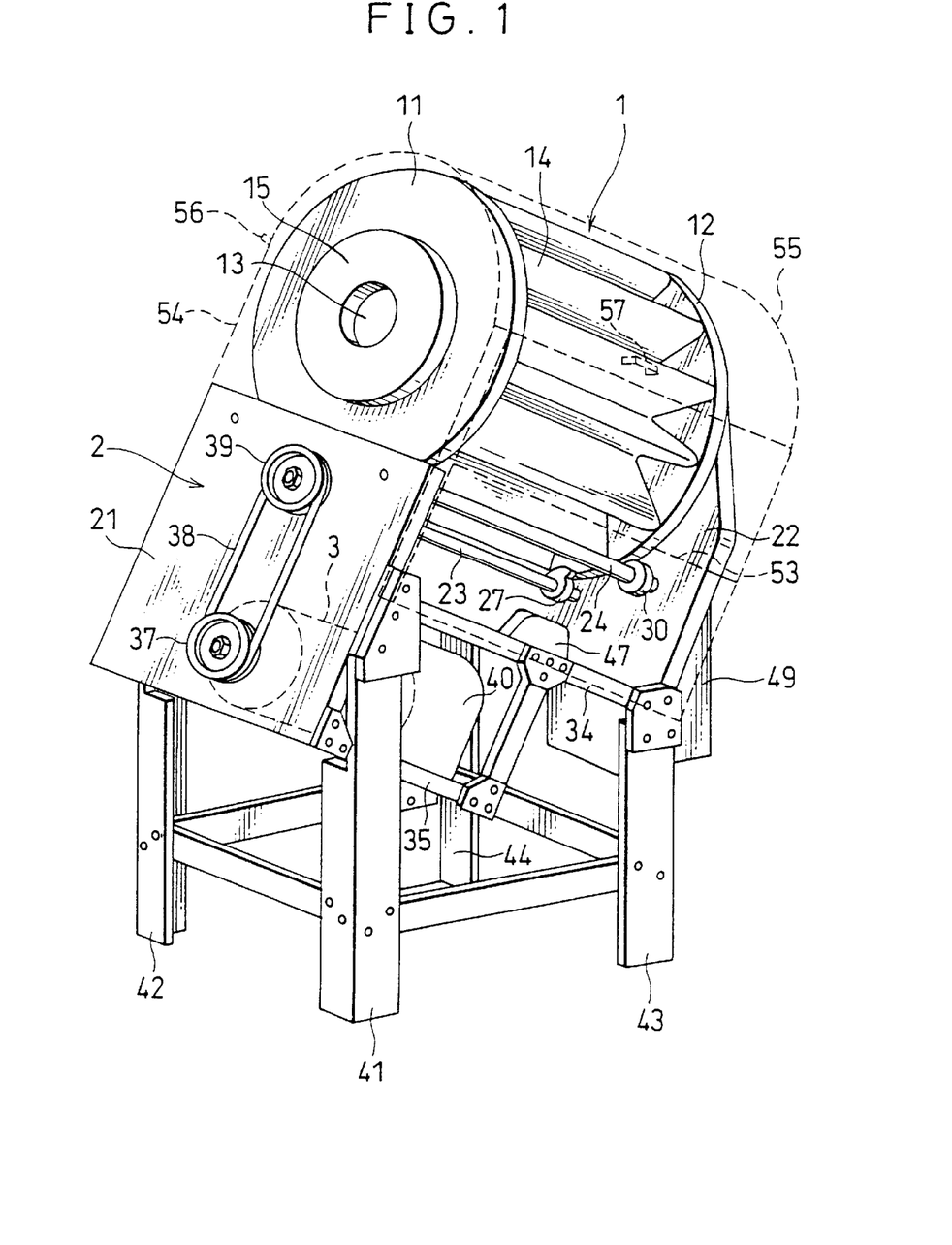
FIG. 1 is a cutaway oblique view showing an external appearance of an apparatus for removing sludge from a filter for use in a wire-cutting electric discharge machine according to an embodiment of the present invention.
Figure 2:
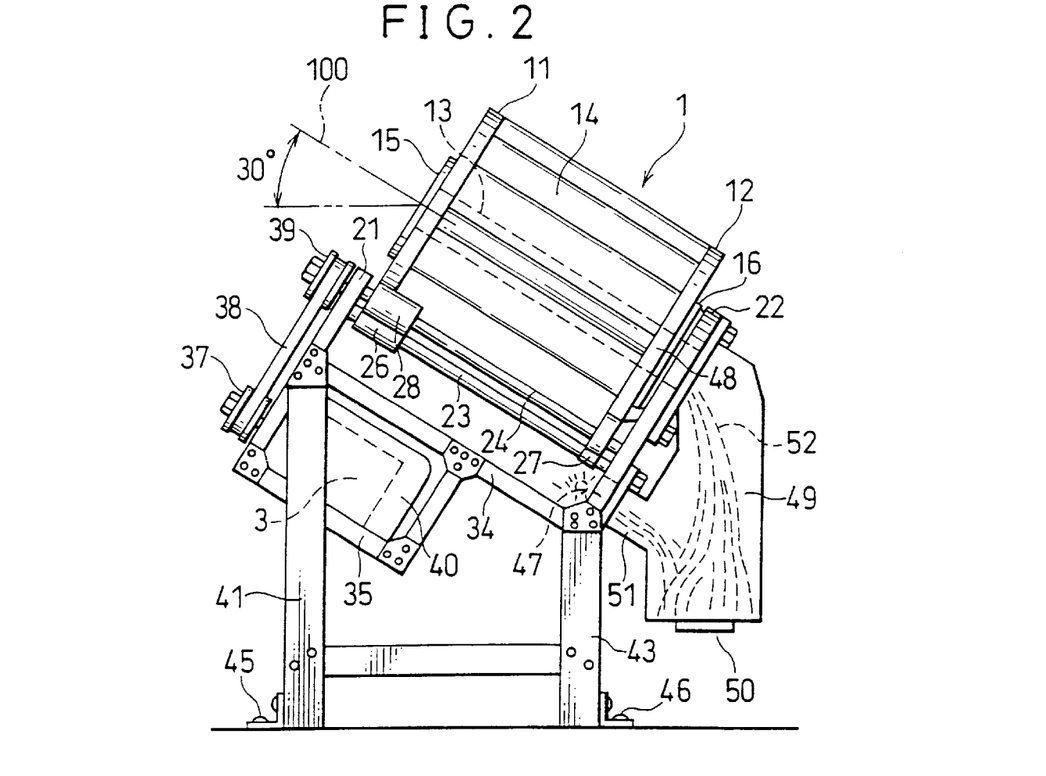
FIG. 2 is a side view of the apparatus of FIG. 1.

FIG. 1 is a cutaway oblique view showing an essential part of an apparatus for removing sludge from a filter for use in a wire-cutting electric discharge machine according to an embodiment of the present invention and FIG. 2 is a side view thereof.

A filter 1 to be treated is entirely cylindrical and is applied for catching sludge contained in the process solution of the electric discharge machine when the process solution flows from an inner periphery to an outer periphery thereof and/or from the outer periphery to the inner periphery. The filter 1 includes the following: disk-like edge plates 11 and 12 that have central holes are disposed at both edge portions of the filter. An inner pipe 13 made of a porous material or mesh is arranged in order to connect the central holes of the edge plates 11 and 12 with each other. A paper filter 14 is arranged along the outer periphery of the inner pipe 13 in the form of pleats or petals (accordion folds), for example. Seal rings 15 and 16 are attached to the center portions of the edge plates 11 and 12.

Figure 3:
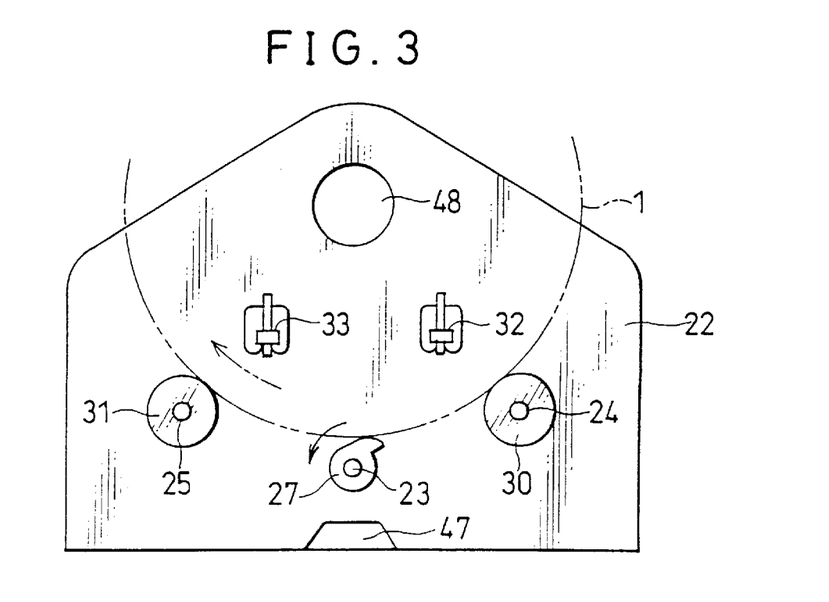
FIG. 3 is a diagram showing a back plate of the apparatus in FIG. 1 viewing from the front.

A filter support device 2 supports the filter 1 so that the central axis 100 of the filter maintains a predetermined angle to the horizontal direction. The predetermined angle is set from 25° to 90°, preferably about 30°. The filter support device 2 may be configured as follows for example. A front plate 21 and a back plate 22 are arranged at the front and rear sides of the filter 1 so as to interpose both the edges of the filter 1 therebetween. A drive shaft 23 is provided between the front plate 21 and the back plate 22. Auxiliary shafts 24 and 25 are provided at both sides of the drive shaft 23 between the front plate 21 and the back plate 22. FIG. 3 is a diagram showing the back plate 22 viewing from the front in the filter axial direction. The drive shaft 23 and the auxiliary shafts 24 and 25 are arranged along the outer periphery of the filter 1 in certain positional relations as shown in FIG. 3. The drive shaft 23 and auxiliary shafts 24, 25 are mounted rotatively on the front and back plates 21 and 22 via not depicted bearings, respectively.

Cams 26 and 27 are mounted on positions, which contact with outer peripheral surfaces of the edge plates 11 and 12 of the filter 1, at both edge portions of the drive shaft 23. They provide both rotative force and successive impactive force to the filter 1 by contacting with the edge plates 11 and 12 of the filter 1. Resilient rollers 28, 29, 30 and 31 (29 is not depicted) are mounted on positions, which contact with outer peripheral surfaces of the edge plates 11 and 12 of the filter 1, at both edge portions of the auxiliary shafts 24 and 25 in order to support the filter 1 rotatively. The filter 1 is supported rotatively by the rollers 28–31, and is driven to rotate and move up and down by the cams 26 and 27 accordingly. The front cam 26 and the rollers 28, 29 extend longitudinally in the axial direction so as for fitting to various sizes of the filter 1. The filter 1 is also supported in the thrust direction in a state of freely movable in the rotational direction and up/down directions by the bearings 32 and 33, which are provided on the back plate 22, capable of sliding up and down.

The front and back plates 21 and 22 are connected with each other through a bottom plate 34. A motor support frame 35 for supporting the motor 3 is coupled beneath the bottom plate 34. The motor 3 supported by the motor support frame 35 has a drive shaft whose front end reaches at the front surface of the front plate 21 therethrough. The drive shaft of the motor 3 and the drive shaft 23 for driving the filter are coupled with each other through a rotation transmission mechanism including a pulley 37, a belt 38 and a pulley 39. The whole motor 3 is covered with a motor cover 40 in order to prevent sludge from falling directly on the motor 3.

Legs 41, 42, 43 and 44 support the front and back plates 21, 22 and others at a predetermined angle. The legs 41–44 are preferably fixed on the floor surface by metal fittings 45 and 46 for preventing the legs from moving due to vibrations, for example. Sludge exclusion openings 47 and 48 are provided at the central position of the coupling portion between the back plate 22 and the bottom plate 34 and at a location corresponding to the central hole of the filter 1, respectively. A bottle-shaped sludge storage 49 is arranged on the back plate 22 for receiving sludge 51 and 52 which are shaken off from the outer periphery of the filter 1 and the surface of the inner pipe 13 through the exclusion openings 47 and 48. A cap 50 for disposing sludge is arranged on the bottom portion of the sludge storage 49.

In this apparatus, the filter 1 is covered with a side plate 53 and a cover 54 as shown with dotted lines in FIG. 1 in order to prevent sludge from flying off to environs. A lid 55 capable of freely opening and closing with a hinge 56 as the central figure is mounted on the cover 54. A handle 57 is used for opening the lid 55 to take out and set the filter 1.

In a case where the process solution moves from the inner pipe 13 to outside the filter 1, the filter 1 requires to be exchanged because it is clogged in a short time with sludge attached on the inner surface of the inner pipe 13 in the filter 1. If the clogged filter 1 is set into the apparatus configured as above, the filter 1 rotates while the motor 3 is driven. The dried sludge peels off from the surface of the inner pipe 13 in the filter 1 with impact given to the rollers 28–31 when the filter 1 moves and drops from the highest position to the lowest position of the cams 26 and 27. The dried sludge travels on the inner surface of the inner pipe 13 along inclination thereof downwardly, and then is accommodated in the sludge storage 49 through the exclusion opening 48 of the back plate 22.

In another case where the process solution moves from outside the filter 1 into the inner pipe 13, the filter 1 is required to be exchanged because it is clogged in a short time with sludge attached on the outer surface of the paper filter 14 in the filter 1. If the clogged filter 1 is also set into the apparatus, the filter 1 rotates while motor 3 is driven. The dried sludge peels off from the outer surface of the paper filter 14 in the filter 1 with impact given to the rollers 28–31 when the filter 1 moves and drops from the highest position to the lowest position of the cams 26 and 27. The peeled sludge is shaken off onto the bottom plate 34, then travels along the upper surface of the bottom plate 34 downwardly, and is accommodated in the sludge storage 49 through the exclusion opening 47 of the back plate 22.

Figure 4:
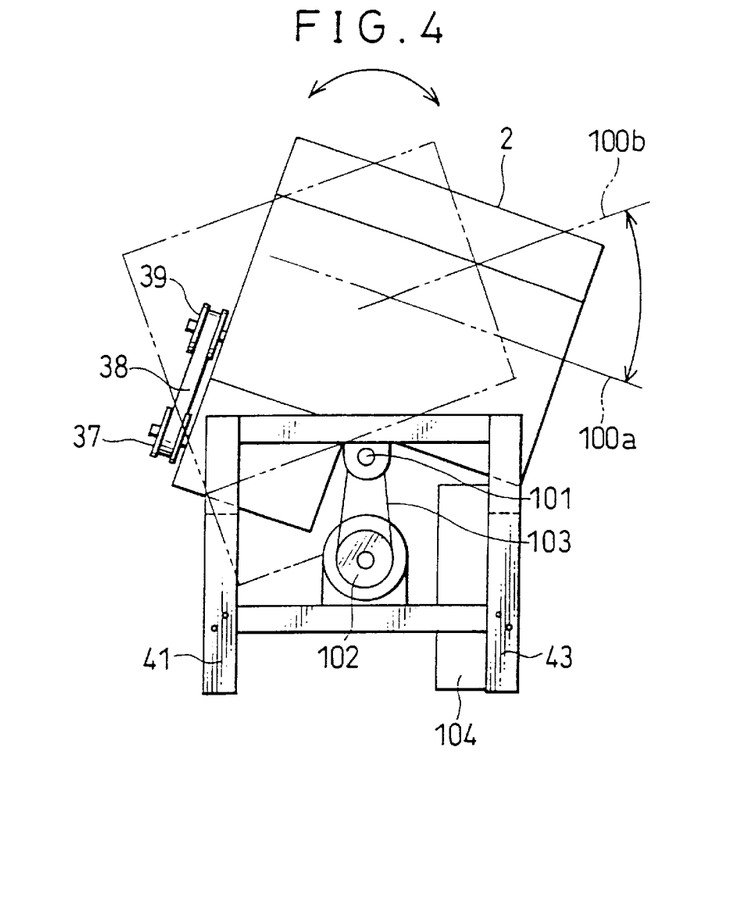
FIG. 4 is a side view showing an external appearance of an apparatus for removing sludge from a filter for use in a wire-cutting electric discharge machine according to another embodiment of the present invention.

FIG. 4 is a side view showing an external appearance of an apparatus for removing sludge from a filter for use in a wire-cutting electric discharge machine according to another embodiment of the present invention. The sludge removing apparatus according to this embodiment further includes an inclination inverting mechanism in addition to the sludge removing apparatus shown in FIGS. 1–3. The inclination inverting mechanism rotates the filter support device 2 with an axis 101 perpendicular to the central axis 100 of the filter 1 as the central figure in order to invert the inclination of the filter 1 in a predetermined cycle. The inclination inverting mechanism includes a motor 102 and a belt (chain or the like) 103 for transmitting a driving force thereof of the motor other than the axis 101. The sludge is taken out of a part of the filter support device 2 at the right side in the figure, and a sludge storing box 104 is arranged directly beneath that part.

Figure 5:
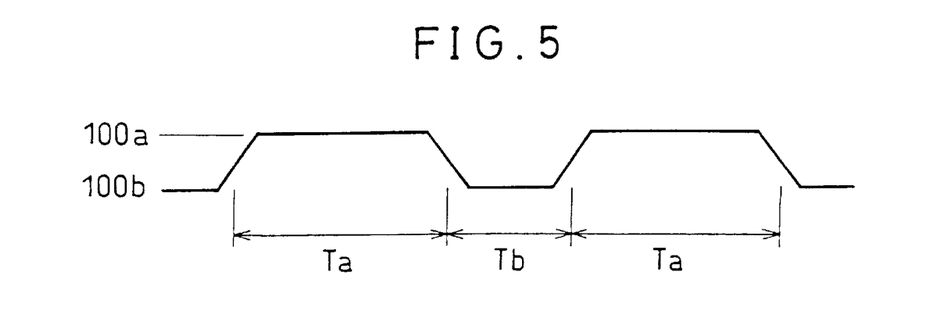
FIG. 5 is a timing chart showing an operational timing of the apparatus of FIG. 4.

The inclination inverting mechanism alternates the inclination of the filter support device 2, that is, of the central axis 100 of the filter 1 held within the device, to 100a and 100b in a predetermined cycle as shown in FIG. 5. A time period Ta for inclining the filter 1 in the inclined direction 100a is set to 3 minutes and a time period Tb for inclining the filter 1 in the inclined direction 100b is set to 1 minute, for example, in FIG. 5. These periods are repeated alternately.

The same operations as those described with FIGS. 1–3 are performed within the filter support device 2 in either inclined state. Namely, the filter 1 is driven to rotate with the central axis 100 as the central figure by the cams 26 and 27, and is given with vibrations simultaneously. An outlet for sludge is located at the right side of the filter support device 2. The sludge that is not removed in a case of the inclined direction 100a is once dropped into the container (53–55 in FIG. 1), and is then dropped into the sludge storing box 104 when the inclined direction returns to 100a again.

Thus, alternating the inclination of the filter 1 so as to invert the up/down relation of the filter 1 may improve the removal efficiency of the sludge within the filter 1 sharply relative to the sludge removing apparatus according to the embodiment shown in FIGS. 1–3.

Figure 6:
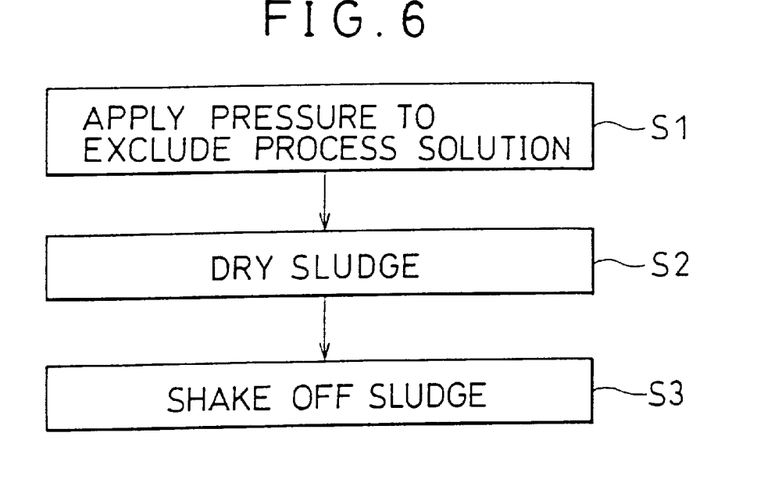
FIG. 6 is a flowchart showing a method for removing sludge according to a further embodiment of the present invention.

FIG. 6 is a flowchart showing a method for removing sludge according to a further embodiment of the present invention. The sludge removing method according to this embodiment comprises three stages of process steps S1–S3. The method is applied to a filter for use in an electric discharge machine for removing sludge contained in a process solution when the process solution flows from an inner periphery to an outer periphery thereof and/or from the outer periphery to the inner periphery. The method serves to remove the sludge attached on the surface of the filter.

The first step S1 is a process for compulsorily excluding the process solution contained within the filter by supplying a pressured air into the filter. The next step S2 is a process for drying the sludge remained within the filter through the step S1. The last step S3 is a process for shaking the dried sludge off from the filter by applying vibrations to the filter. The sludge removing apparatus described with reference to FIGS. 1–6 can be preferably adapted to this process. The step S1 of applying pressure for excluding process solution is a pretreatment to shorten the step S2 of drying sludge.

Figure 7:
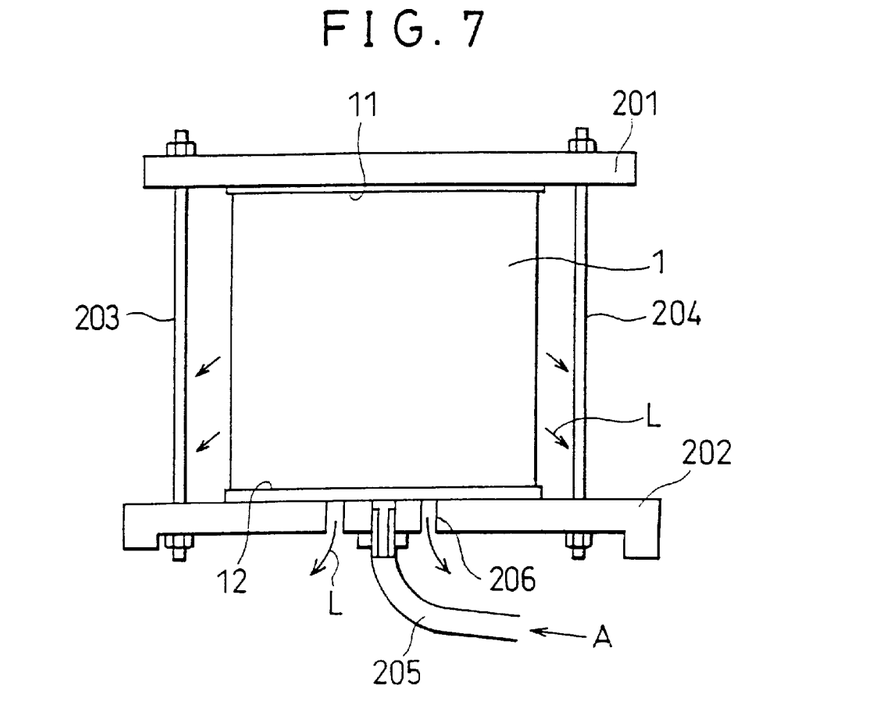
FIG. 7 is a side view explaining the step of applying pressure for excluding process solution.

FIG. 7 is a side view explaining an embodied example of the step S1 of applying pressure for excluding process solution. The filter 1 to be directed into the step S1 is impregnated with a large amount of the process solution containing the sludge. The filter 1 is sandwiched between upper and lower supporting plates 201 and 202 in order to protect both the edge plates 11 and 12 of the filter 1 from the following applied pressure. The numeral references 203 and 204 denote removable shafts for connecting the upper and lower supporting plates 201 and 202 with each other. The filter 1 is so arranged that the opening of the inner pipe 13 shown in FIG. 1 may face downwardly. A pressured air A supplied through a conduit 205 is conducted inside the filter 1 through the opening. When the conducted pressured air A escapes outside the filter 1 through the inner pipe, a process solution L impregnated in the filter 1 is extruded compulsorily to the outer peripheral surface of the filter 1, and falls through a hole 206 formed on the lower supporting plate 202.

The residual process solution still remaining within the filter 1 after applying pressure to exclude the process solution as described above is removed at the next step S2 of drying sludge. There are various drying methods. Accommodating the filter 1 within a drying machine to dissipate the process solution, for example, may dry the sludge contained therein. A time necessary for drying can be shortened by introducing a dried air through a dehumidifier into the drying machine at the same time.

The filter 1 through the drying step is applied with rotations and vibrations as described above at the subsequent step S3 of shaking off sludge, preferably being accommodated in the above-described sludge removing apparatus according to the present invention. The dried sludge has an extremely lowered viscosity and can be dropped efficiently apart from the filter 1 with vibrations.

As described above, the sludge removing apparatus of the present invention holds the filter rotatively within the filter support device in the state where the central axis of the filter is inclined by a predetermined angle to the horizontal direction, and the cams apply rotational driving force and successive impactive force to the filter. The sludge attached on the surface of the filter travels on the outer or inner periphery of the filter from a higher portion to a lower portion due to rotations and impactive force and finally falls into the sludge storage for accommodation. The sludge attached to the used filter can be effectively removed and the filter can be reused. The present invention can reduce the maintenance expense for processing effectively and may also contribute greatly to reduce the resource accordingly.

According to this improved sludge removing apparatus of the present invention, the apparatus further comprises the mechanism for inverting the inclined direction of the filter by rotating the filter support device with the axis perpendicular to the central axis of the filter as the central figure in a predetermined cycle. Thus, the sludge removal efficiency can be further improved.

According to the sludge removing method of the present invention, the step of drying the sludge remained within the filter and the step of dropping the dried sludge from the filter by apply vibrations to the filter are implemented. The step of applying the pressured air into the filter to exclude the process solution contained within the filter may further be added as a pretreatment preceding the step of drying the sludge at need. Thus, the sludge removal efficiency can be effectively improved.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. An apparatus for removing sludge attached on a surface of a generally cylindrical filter element, said filter element being adapted to remove sludge from a process solution flowing from an inner periphery surface to an outer periphery surface and/or said outer periphery surface to said inner periphery surface of said filter, said apparatus comprising:
   a filter element support device for holding said filter rotatively with the central axis thereof inclined by a predetermined angle to the horizontal direction, said filter element support device including cams for providing rotational driving force and successive impactive force to said filter element;
   a motor for providing rotational driving force to said cams; and
   sludge storage for receiving said sludge falling from said filter element.

2. The apparatus for removing sludge according to claim 1, wherein said filter element support device includes:
   a front plate arranged at a front edge side of said filter element;
   a back plate arranged at a rear edge side of said filter element;
   a drive shaft disposed rotatively between said front and back plates;
   a plurality of cams mounted on front and rear edge portions of said drive shaft, said cams contacting with front and rear edge portions of an outer periphery of said filter with a certain frictional force;
   a rotation transmission mechanism for transmitting rotational force of said motor to said drive shaft;
   a pair of auxiliary shafts arranged on both sides of said drive shaft between said front and back plates;
   a plurality of rollers mounted on front and rear edge portions of said auxiliary shafts for supporting rotatively said front and rear edge portions of said outer periphery of said filter;
   a bearing arranged on a plane of said back plate opposing to said rear edge portion of said filter for holding a rear edge surface of said filter rotatively and up/down movably; and
   a plurality of legs for supporting said front and back plates and said drive and auxiliary shafts inclined by a predetermined angle to the horizontal direction.

3. The apparatus for removing sludge according to claim 1, wherein said apparatus further comprises a mechanism for inverting an inclined direction of said filter element by rotating said filter element support device with an axis perpendicular to said central axis of said filter element in a predetermined cycle.

4. A method for removing sludge attached on a surface of a generally cylindrical filter element, said filter element being adapted to remove sludge from a process solution flowing from an inner periphery surface to an outer periphery surface and/or said outer periphery surface to said inner periphery surface of said filter element, said method comprising the steps of:
   providing a filter element support device for holding said filter rotatively with the central axis thereof inclined by a predetermined angle to the horizontal direction, said filter element support device including cams for providing rotational driving force and successive impactive force to said filter element;
   providing a motor imparting rotational driving force to said cams;
   providing sludge storage for receiving said sludge falling from said filter element;
   drying said sludge remaining on said filter element; and
   dropping said dried sludge from said filter element into said sludge storage by applying successive impactive force to said filter element.

5. A method for removing sludge attached on a surface of a generally cylindrical filter element, said filter element being adapted to remove sludge from a process solution flowing from an inner periphery surface to an outer periphery surface and/or said outer periphery surface to said inner periphery surface of said filter element, said method comprising the steps of:
   providing a filter element support device for holding said filter rotatively with the central axis thereof inclined by a predetermined angle to the horizontal direction, said filter element support device including cams for providing rotational driving force and successive impactive force to said filter element;

providing a motor for providing rotational driving force to said cams; and providing sludge storage for receiving said sludge falling from said filter element, said apparatus further comprising a mechanism for inverting an inclined direction of said filter element by rotating said filter element support device with an axis perpendicular to said central axis of said filter element;

drying said sludge remaining on said filter element;

dropping said dried sludge from said filter element by applying vibrations to said filter; and rotating said filter element about said perpendicular axis on a predetermined cycle.

6. A method for removing sludge attached on a surface of a generally cylindrical filter element, said filter element being adapted to remove sludge from a process solution flowing from an inner periphery surface to an outer periphery surface and/or said outer periphery surface to said inner periphery surface of said filter element, said method comprising the steps of:

a) providing:
i) a front plate arranged at a front edge side of said filter element;
ii) a back plate arranged at a rear edge side of said filter element;
iii) a drive shaft disposed rotatively between said front and back plates;
iv) a plurality of cams mounted on front and rear edge portions of said drive shaft, said cams contacting with front and rear edge portions of an outer periphery of said filter with a certain frictional force;
v) a rotation transmission mechanism for transmitting rotational force of said motor to said drive shaft;
vi) a pair of auxiliary shafts arranged on both sides of said drive shaft between said front and back plates;
vii) a plurality of rollers mounted on front and rear edge portions of said auxiliary shafts for supporting rotatively said front and rear edge portions of said outer periphery of said filter;
viii) a bearing arranged on a plane of said back plate opposing to said rear edge portion of said filter for holding a rear edge surface of said cylindrical filter rotatively and up/down movably; and
ix) a plurality of legs for supporting said front and back plates and said drive and auxiliary shafts inclined by a predetermined angle to the horizontal direction;

b) drying said sludge remained on said filter element; and c) dropping said dried sludge from said filter element by applying vibrations to said filter.

7. The methods according to claims 4, 5, and 6 further comprising the step of feeding a process solution from an electrical discharge machine to said generally cylindrical filter prior to the drying step.

* * * * *

UNITED STATES PATENT AND TRADEMARK OFFICE
CERTIFICATE OF CORRECTION

PATENT NO. : 6,183,653 B1
DATED : February 6, 2001
INVENTOR(S) : Takeshi Yoshida It is certified that error appears in the above-identified patent and that said Letters Patent is hereby corrected as shown below:

Title Page,
Under (56) References Cited, OTHER DOCUMENTS, insert:

-- "Measuring Method of Distance Between Top and Bottom Guides in Wire-Cut Electric Discharge Machine", English-Language Abstract of JP 59-64233, pulished April 12, 1984;

"Wire-Cut Electric Discharge Machining Method", English-Language Abstract of JP 59-64234, pulished April 12, 1984;

"Manufacture Method of Slide Member for Mechanical Seal", English-Language Abstract of JP 59-64235, published April 12, 1984" --.

Signed and Sealed this

Twenty first Day of August, 2001

Attest:

NICHOLAS P. GODICI
*Attesting Officer*  *Acting Director of the United States Patent and Trademark Office*